US012562769B2

(12) United States Patent
Jansen et al.

(10) Patent No.: US 12,562,769 B2
(45) Date of Patent: Feb. 24, 2026

(54) INTEGRATED WIDEBAND COMMUNICATION CIRCUIT

(71) Applicant: BAE SYSTEMS Information and Electronic Systems Integration Inc., Nashua, NH (US)

(72) Inventors: Douglas S. Jansen, Durango, CO (US); Sean Sengele, Groton, MA (US); Marc A. Fisher, Amherst, NH (US); Gregory M. Flewelling, Freeport, ME (US); Curtis M. Grens, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 295 days.

(21) Appl. No.: 18/363,243

(22) Filed: Aug. 1, 2023

(65) Prior Publication Data

US 2025/0047315 A1     Feb. 6, 2025

(51) Int. Cl.
H04B 1/3805 (2015.01)
H04B 1/04 (2006.01)

(52) U.S. Cl.
CPC ......... H04B 1/3805 (2013.01); H04B 1/0483 (2013.01); *H04B 2001/3811* (2013.01)

(58) Field of Classification Search
CPC ...... H04B 1/40; H04B 1/0483; H04B 7/0617; H04B 1/28; H04B 7/0413; H04B 1/18; H04B 15/04; H04B 1/0458; H04B 1/525; H04B 1/0057; H04B 1/1081; H04B 1/406; H04B 1/44; H04B 2001/0408; H04B 1/3805; H04B 15/02; H04B 1/0003; H04B 2001/3811; H04B 1/006; H04B 1/12;
(Continued)

(56) References Cited

U.S. PATENT DOCUMENTS

| | | | |
|---|---|---|---|
| 7,012,489 | B2 | 3/2006 | Sherrer et al. |
| 7,557,673 | B1 | 7/2009 | Meharry |

(Continued)

FOREIGN PATENT DOCUMENTS

| | | |
|---|---|---|
| EP | 3176950 A1 | 6/2017 |

OTHER PUBLICATIONS

International Search Report, PCT/US24/40264, mailed Nov. 25, 2024, 12 pages.
(Continued)

*Primary Examiner* — Golam Sorowar
(74) *Attorney, Agent, or Firm* — Gary McFaline

(57) ABSTRACT

A communications circuit includes a first circuit block and a second circuit block. The first circuit block includes a first splitter, a first signal path coupled to a first output of the first splitter, a second signal path coupled to a second output of the first splitter, and a first switch configured to couple the second signal path to a third signal path or to couple a fourth signal path to the third signal path. The second circuit block includes a second splitter, a fifth signal path coupled to a first output of the second splitter, a sixth signal path coupled to a second output of the second splitter, and a second switch configured to couple the sixth signal path to the third signal path or to couple a seventh signal path to the third signal path. The third signal path extends between the first and second circuit blocks.

9 Claims, 8 Drawing Sheets

(58) Field of Classification Search
CPC ...... H04B 1/1607; H04B 1/3827; H04B 1/48;
H04B 7/0482; H04B 7/0639; H01L
23/66; H01L 2223/6677; H01L
2224/12105; H01L 2224/48091; H01L
2224/48227; H01L 24/48; H01L 24/49;
H01L 2924/00; H01L 2924/00014; H01L
2924/014; H01L 2924/15311; H01L
2224/16227; H01L 25/16; H01L
2924/19105; H01L 2224/131; H01L
2224/16235; H01L 23/49816; H01L
23/5383; H01L 2924/3025
See application file for complete search history.

(56) References Cited

U.S. PATENT DOCUMENTS

| | | | |
|---|---|---|---|
| 7,847,653 B2 | 12/2010 | Meharry | |
| 8,026,775 B2 | 9/2011 | Meharry | |
| 10,270,583 B2 * | 4/2019 | Hiebert | H04L 7/02 |
| 10,778,270 B1 | 9/2020 | Jansen | |
| 11,424,539 B2 | 8/2022 | Alpman et al. | |
| 2015/0325908 A1 * | 11/2015 | Reuter | H01Q 1/38 |
| | | | 29/601 |
| 2017/0019129 A1 * | 1/2017 | Väisänen | H04B 1/0078 |
| 2017/0155362 A1 * | 6/2017 | Selvanayagam | H04B 1/16 |
| 2019/0044551 A1 | 2/2019 | Dinc et al. | |
| 2020/0235774 A1 * | 7/2020 | Lee | H03F 3/19 |

OTHER PUBLICATIONS

Cali, et al., "Wideband Transceiver Employing Diverse Semiconductor and Packaging Technologies," ITAR (Jan. 11, 2019). pp. 196-201.

* cited by examiner

INTEGRATED WIDEBAND COMMUNICATION CIRCUIT

FIELD OF DISCLOSURE

The present disclosure relates to communication systems, and more particularly to integrated wideband communication circuits.

BACKGROUND

Receivers and transceivers with wide tuning ranges are desirable for various applications, including radar warning systems, identification friend-or-foe (IFF) systems, and general radio frequency (RF) communication systems. Many competing factors must be considered when designing such devices, as both power and space are often limited in many applications. To these ends, there are a number of non-trivial issues associated with developing such wide-band RF communication systems.

BRIEF DESCRIPTION OF THE DRAWINGS

Features and advantages of embodiments of the claimed subject matter will become apparent as the following Detailed Description proceeds, and upon reference to the Drawings, in which:

Figures 1A, 1B:
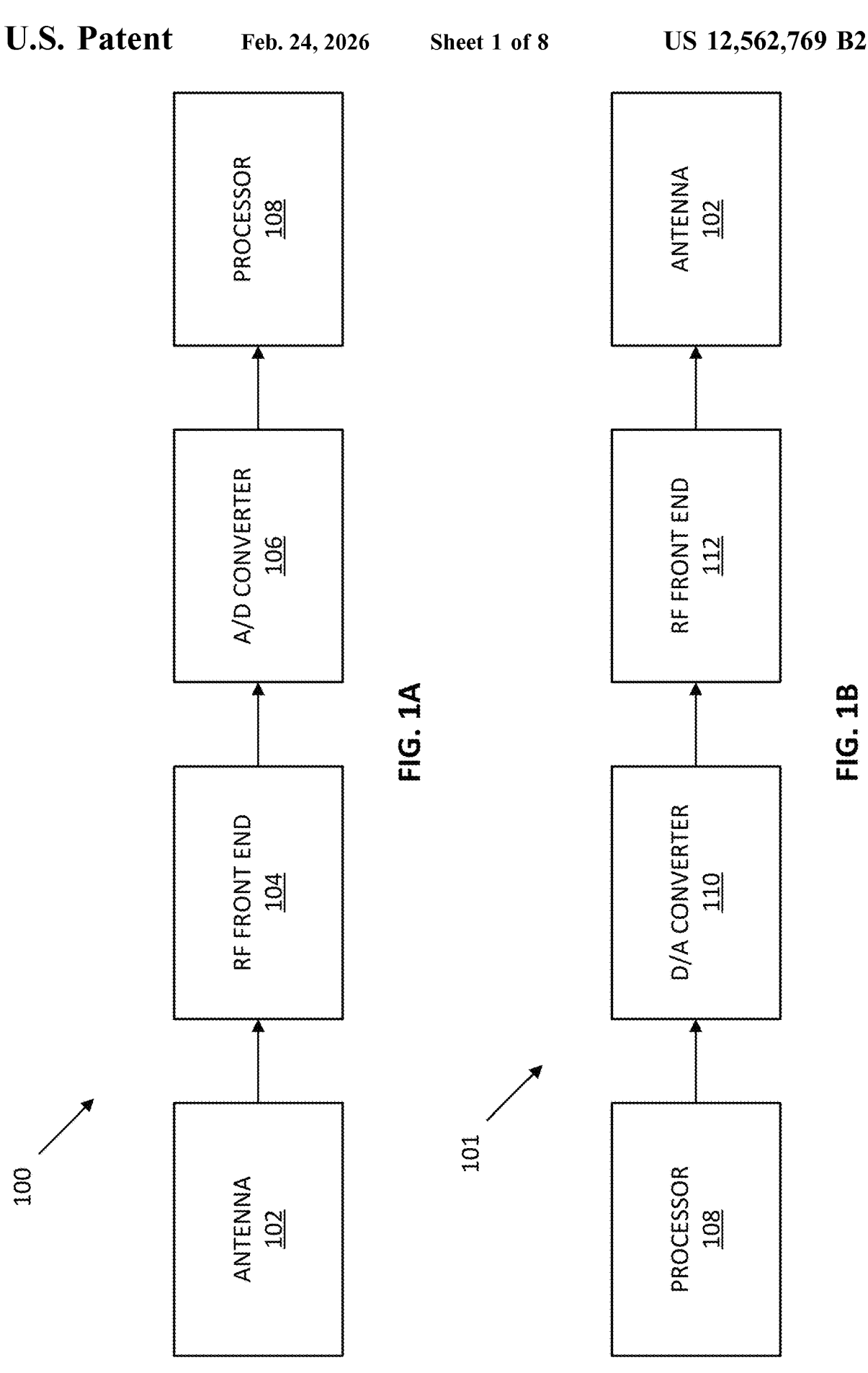
FIG. 1A illustrates a block diagram of an RF receiver system, in accordance with an embodiment of the present disclosure.
FIG. 1B illustrates a block diagram of an RF transmitter system, in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

Wide-band RF receivers are useful tools for listening across a large frequency bandwidth for various types of signals and are especially important in situations where the frequency of interest may not be known beforehand. Example situations include electronic warfare or surveillance where enemy signals or otherwise given signals of interest can be intercepted and decoded, scrambled, or altered, which may be done in some cases, for instance, to confuse an enemy receiver or to monitor communications in a given location. In such situations, a given signal of interest may vary across a wide possible frequency range, thus requiring an RF receiver to scan across a large frequency range to identify possible signals of interest. Furthermore, a wideband RF transmitter is useful across several applications that may require different frequency bands.

As noted above, there are a number of non-trivial issues associated with developing wide-band RF transceivers. For example, the use of multiple filters and other components for both transmitter (Tx) and receiver (Rx) operation consume considerable volume and require greater power consumption. Thus, a wide-band RF system is described herein. To overcome the issues discussed above, a modular design for the system is proposed that uses a three-dimensional interposer with integrated filters that work for either a transmitter or receiver configuration and include pin-out connections that are common to either a transmitter or receiver chip. Furthermore, according to some embodiments, resource sharing is performed across local oscillator circuits to share a local oscillator signal between two or more Tx/Rx chips. Such approaches can reduce the total footprint of the RF system, allowing for easier integration into a system-in-package (SIP) architecture while also reducing the total power consumption.

An example transceiver system disclosed herein may operate over a wide band of frequencies, such as a frequency range spanning from Ku to Ka+ bands (e.g., between 15 GHZ and 55 GHZ) with a wide instantaneous bandwidth (e.g., 5 GHZ to 10 GHZ). According to some embodiments, the modular design of the components allows for swappable elements (e.g., Tx or Rx chip can be swapped into or out of the same interposer) and resource sharing across different chips. For example, the local oscillator of one chip (Rx or Tx) may be used as a master oscillator to control the oscillator signal being mixed with the sample signal of another chip (Rx or Tx) or any number of other Rx or Tx chips. According to some embodiments, a two channel Rx and/or Tx module may be designed within a chip or SIP footprint of around 1.5"×3.85"×0.45".

In one specific embodiment, a communications circuit includes a first circuit block and a second circuit block. The first circuit block includes a first splitter configured to receive a first local oscillator signal from a first local oscillator, a first signal path coupled to a first output of the first splitter, a second signal path coupled to a second output of the first splitter, a first switch configured to couple the second signal path to a third signal path or to couple a fourth signal path to the third signal path, and a first multiplexer having a first input coupled to the first signal path and a second input coupled to the fourth signal path. The second circuit block includes a second splitter configured to receive a second local oscillator signal from a second local oscillator, a fifth signal path coupled to a first output of the second splitter, a sixth signal path coupled to a second output of the second splitter, a second switch configured to couple the sixth signal path to the third signal path or to couple a seventh signal path to the third signal path, and a second multiplexer having a first input coupled to the fifth signal path and a second input coupled to the seventh signal path. The third signal path extends between the first circuit block and the second circuit block.

In another embodiment, a SIP device includes a three-dimensional interposer and an integrated circuit die on the three-dimensional interposer. The three-dimensional interposer comprises a plurality of filters on, or integrated into, the structure of the three-dimensional interposer. The integrated circuit die includes a splitter configured to receive a local oscillator signal from a local oscillator, a first signal path coupled to a first output of the splitter, a second signal path coupled to a second output of the splitter, and a first switch configured to couple the second signal path to a third signal path or to couple a fourth signal path to the third signal path. The third signal path leads off of the integrated circuit chip.

In another embodiment, an RF system includes an antenna, RF circuitry configured to receive a first RF signal from the antenna and provide a first intermediate frequency (IF) signal or configured to receive a second IF signal and transmit a second RF signal to the antenna, an analog-to-digital converter (ADC) configured to receive the first IF signal and to generate a digitized signal or a digital-to-analog converter (DAC) configured to receive a digitized signal and generate the second IF signal, and a digital signal processor configured to receive the digitized signal from the ADC or to generate the digitized signal transmitted to the DAC. The RF circuitry comprises a splitter configured to receive a local oscillator signal from a local oscillator, a first signal path coupled to a first output of the splitter, a second signal path coupled to a second output of the splitter, a first switch configured to couple the second signal path to a third signal path or to couple a fourth signal path to the third signal path, and a second switch configured to couple a fifth signal path to the third signal path or to couple a sixth signal path to the third signal path.

Numerous variations and alternative embodiments will be appreciated in light of this disclosure. The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y.

RF Transceiver Architecture

FIG. 1A illustrates an example RF receiver 100 while FIG. 1B illustrates an example RF transmitter 101, according to an embodiment. Both RF receiver 100 and RF transmitter 101 can be include in the same transceiver device for receiving and transmitting RF signals. Accordingly, some elements may be commonly used by both RF receiver 100 and RF transmitter 101, such as antenna 102 and processor 108. In other embodiments separate antennas and/or processors may be used in each of RF receiver 100 and RF transmitter 101. RF receiver 100 and RF transmitter 101 may be included in the same chip package or in separate chip packages on the same printed circuit board (PCB).

RF receiver 100 includes antenna 102, RF front end circuitry 104, an analog-to-digital converter (ADC) 106, and processor 108. In some cases, RF receiver 100 is implemented as a system-on-chip, or a chip set populated on a printed circuit board (PCB) which may in turn be populated into a chassis of a multi-chassis system or an otherwise higher-level system, although any number of implementations can be used. RF receiver 100 may be one portion of an electronic device that sends and/or receives RF signals.

RF transmitter 101 includes processor 108, a digital-to-analog (DAC) converter 110, RF front end circuitry 112, and antenna 102. In some cases, RF transmitter 101 is implemented as a system-on-chip, or a chip set populated on a printed circuit board (PCB) which may in turn be populated into a chassis of a multi-chassis system or an otherwise higher-level system, although any number of implementations can be used. RF transmitter 101 may be one portion of an electronic device that sends and/or receives RF signals.

Antenna 102 on either or both of RF receiver 100 and RF transmitter 101 may include one or more patch antennas or microstrip antennas, according to some embodiments. Any number of antennas may be included in antenna 102. In some embodiments, antenna 102 may include one or more antennas to support multiple communication bands (e.g., dual band operation or tri-band operation). For example, some of the antennas may support tri-band operation at 28 gigahertz, 39 gigahertz, and 60 gigahertz. Various ones of the antennas may support tri-band operation at 24.5 gigahertz to 29 gigahertz, 37 gigahertz to 43 gigahertz, and 57 gigahertz to 71 gigahertz. Various ones of the antennas may support 5G communications and 60 gigahertz communications. Various ones of the antennas may support 28 gigahertz and 39 gigahertz communications. Various ones of the antennas may support millimeter wave communications. Various ones of the antennas may support high band frequencies and low band frequencies. In a more general sense, antenna 102 may be any number of antenna types and configurations suitable for receiving and transmitting desired communication signals, as will be appreciated.

RF front end circuitry 104 may include various components that are designed to filter, amplify, and tune selected portions of a received RF signal, according to an embodiment. RF front end circuitry may be designed to have a high dynamic range that can tune across a wide bandwidth of frequencies. For example, RF front end circuitry 104 may include components that are capable of tuning to particular frequency ranges within a signal having a bandwidth in the gigahertz range, such as bandwidths between 5 GHZ and 55 GHz. For example, RF front end circuitry 104 includes one or more mixers for down-conversion of the received RF signal such as to an IF signal. In some embodiments, RF front end circuitry 104 includes one or more integrated circuit (IC) chips packaged together in a SIP. The SIP may include a three-dimensional interposer that provides mounting locations for each of the various ICs, as well as filters provided in the interposer. RF front end circuitry 104 may include a local oscillator used to generate an LO signal for down-conversion of the received RF signal, which may be a master oscillator that controls the LO signals for one or more other mixers. In some embodiments, RF front end circuitry 104 acts as a slave circuit that receives a LO signal generated from another chip or circuit.

ADC 106 may be implemented to receive a filtered, amplified RF signal from RF front end circuitry and to convert the signal into a digital signal for further processing. ADC 106 may be any known type of ADC without limitation. In some embodiments, ADC 106 has a linear range of between about 6 GHZ and about 10 GHZ, and the output resolution is in the range of 6 to 12 bits, although the present disclosure is not intended to be limited to such specific implementation details.

Processor 108 may be configured to receive the digitized signal from ADC 106 and perform any number of operations with the signal. For example, processor 108 may look for particular patterns or signatures in the received digital signal. As used herein, the term "processor" may refer to any device or portion of a device that processes electronic data from registers and/or memory to transform that electronic data into other electronic data that may be stored in registers and/or memory. Processor 108 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, custom-built semiconductor, or any other suitable processing devices.

Turning to RF transmitter 101, processor 108 may also be configured to generate a digitized signal having data to be transmitted out using antenna 102. DAC 110 may be implemented to receive the digitized signal from processor 108 and to convert the signal into an analog signal for up-conversion into a viable RF signal to be transmitted via antenna 102. DAC 110 may be any known type of DAC without limitation. In some embodiments, DAC 110 has a linear range of between about 6 GHz and about 10 GHz, and an input resolution in the range of 6 to 12 bits, although the present disclosure is not intended to be limited to such specific implementation details.

RF front end circuitry 112 may include various components that are designed to filter noise, amplify, and/or tune selected portions of the analog signal received from DAC 110, according to an embodiment. For example, RF front end circuitry 112 may include components that are capable of up-converting the analog signal into suitable RF frequencies such as bandwidths between 5 GHZ and 55 GHz. RF front end circuitry 112 may include one or more mixers for up-conversion of the received analog signal. In some embodiments, RF front end circuitry 112 includes one or more integrated circuit (IC) chips packaged together in a SIP. The SIP may include a three-dimensional interposer that provides mounting locations for each of the various ICs, as well as filters provided in the interposer. RF front end circuitry 104 may include a local oscillator used to generate an LO signal for up-conversion of the received analog signal, which may be a master oscillator that controls the LO signals for one or more other mixers. In some embodiments, RF front end circuitry 112 acts as a slave circuit that receives a LO signal generated from another chip or circuit.

Figures 2A, 2B:
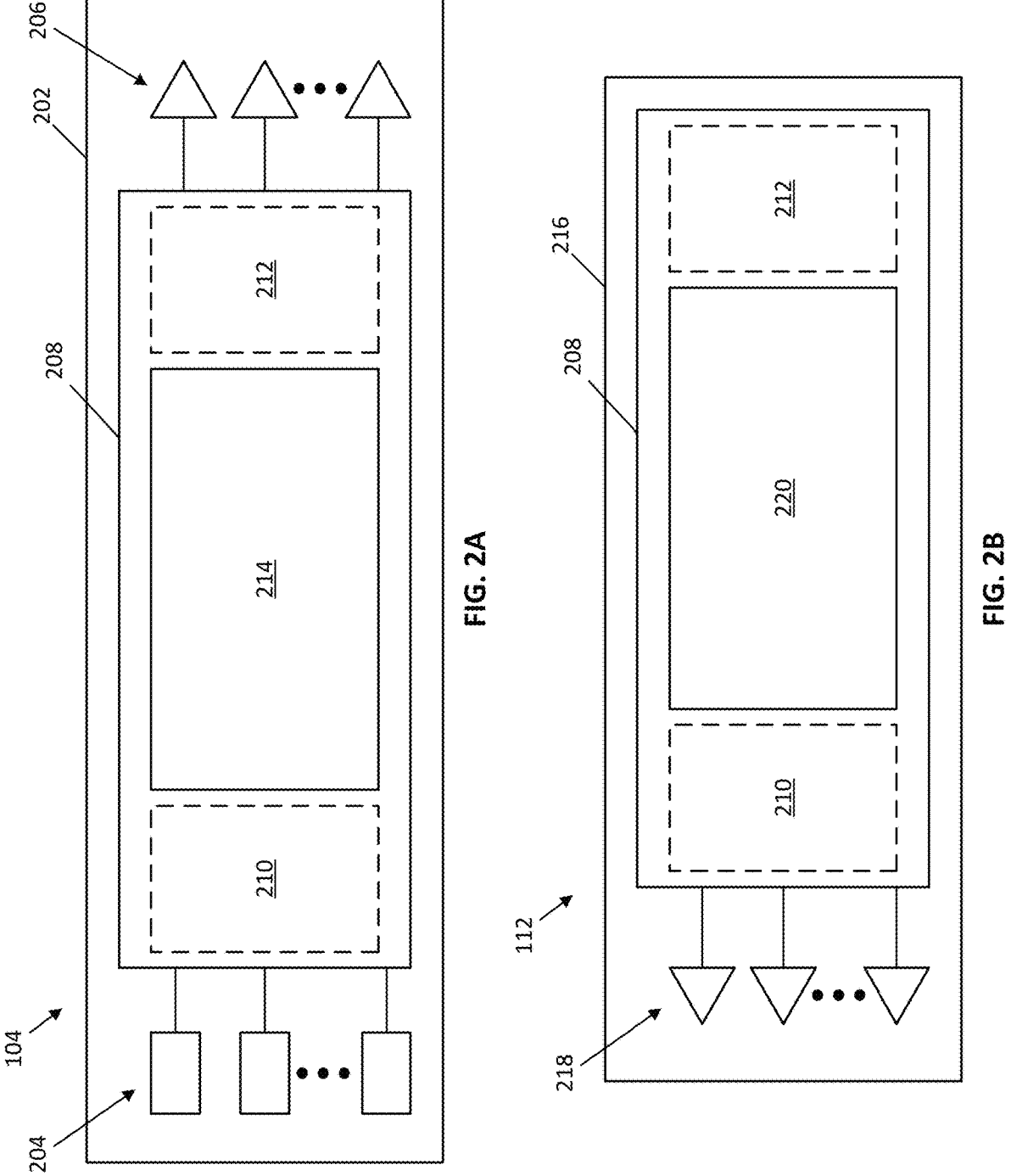
FIG. 2A illustrates a schematic diagram of RF front end circuitry in the RF receiver system of FIG. 1A, in accordance with an embodiment of the present disclosure.
FIG. 2B illustrates a schematic diagram of RF front end circuitry in the RF transmitter system of FIG. 1B, in accordance with an embodiment of the present disclosure.

FIG. 2A illustrates a more detailed schematic representation of at least a portion of RF front end circuitry 104, while FIG. 2B illustrates a more detailed schematic representation of at least a portion of RF front end circuitry 112, according to an embodiment. Starting with FIG. 2A, RF front end circuitry 104 includes a substrate 202 (such as a laminate board or printed circuit board) having a switching bank 204 designed to receive any number of RF channels. According to some embodiments, RF signals are received from antenna 102 across any number of different channels and switching bank 204 routes the received signals to the appropriate filters for down conversion of certain signal bands. Switching bank 204 may include any number of transistor switches or other switching architectures (such as microelectromechanical switches). Substrate 202 may also include any number of amplifiers 206 used to boost the received signal power following downconversion by the components on interposer

208. Any number of amplifiers may be used across any number of RF channels. According to some embodiments, the output(s) from amplifiers 206 are received by ADC 106.

According to some embodiments, interposer 208 is coupled to substrate 202, such that interposer 208 receives RF signals across any number of channels from switching bank 204 and transmits RF signals across any number of channels to amplifiers 206. Interposer 208 includes integrated filters and a receiver integrated circuit (IC) 214 for performing RF downconversion on the received RF signal(s).

According to some embodiments, interposer 208 may include a filter bank 210 that includes any number of integrated bandpass filters for selecting certain bands of the received RF signal. The bandpass filters allow for frequency ranges between 15 GHZ and 55 GHz to be used, according to some embodiments. In one example, a first filter of filter bank 210 selects a frequency range between 15 GHZ and 28 GHZ, a second filter of filter bank 210 selects a frequency range between 24 GHZ and 42 GHZ, and a third filter of filter bank 210 selects a frequency range between 35 GHz and 55 GHz. The switches of switching bank 204 may be used to select which band pass filter to use for a given RF channel.

According to some embodiments, interposer 208 also includes one or more intermediate frequency (IF) filter(s) 212 (e.g., at least one for each RF channel) designed to remove any noise or images outside of the intermediate frequency range that includes the data of interest. In one example, IF filter 212 selects a frequency range between 5 GHZ and 25 GHZ.

Receiver IC 214 may be a die of semiconductor material that includes the logic and mixing circuitry used to properly downconvert the received RF signals. In some embodiments, receiver IC 214 includes a substrate of silicon germanium. For example, receiver IC 214 may include any number of low noise amplifiers (LNA), local oscillator (LO) generators, and mixers. A more detailed discussion of receiver IC 214 is provided herein with reference to FIG. 5A.

Turning to FIG. 2B, RF front end circuitry 112 includes a substrate 216 (such as a laminate board or printed circuit board) having a plurality of amplifiers 218 used to amplify one or more upconverted RF signals across any number of channels before they are transmitted out on antenna 102. RF signals may be upconverted using a transmitter IC (220) and the integrated filters of interposer 208. According to some embodiments, interposer 208 along with its integrated filter bank 210 and IF filters 212 may be the same for use in either RF front end circuitry 104 or RF front end circuitry 112. As such, interposer 208 may have common pin connections for interfacing with either receiver IC 214 or transmitter IC 220.

In the RF transmission path, IF filters 212 receive the signal of interest to be transmitted from DAC 110 within the given IF band and remove any signals outside of the IF band. The signal is then upconverted using transmitter IC 220. Transmitter IC 220 may be a die of semiconductor material that includes the logic and mixing circuitry used to properly upconvert the generated RF signals. In some embodiments, transmitter IC 220 includes a substrate of silicon germanium. For example, transmitter IC 220 may include any number of low pass filters, local oscillator (LO) generators, and mixers. A more detailed discussion of transmitter IC 220 is provided herein with reference to FIG. 5B. Once the RF signal has been mixed during upconversion, a transmission band is selected using one of the filters of filter bank 210.

According to some embodiments, the various components of RF front end circuitry 104 may be integrated on the same substrate (e.g., PCB) as RF front end circuitry 112, as may be used, for example, in a transceiver architecture. Furthermore, each of RF front end circuitry 104 and RF front end circuitry 112 may be included together within the same system in package (SIP). According to some embodiments, resources may be shared between RF front end circuitry 104 and RF front end circuitry 112 (such as local oscillator signals used by receiver IC 214 and transmitter IC 220), as described herein. In some examples, RF front end circuitry 104 encompasses any number of Rx channels that can share resources and RF front end circuitry 112 encompasses any number of Tx channels that can share resources.

Figure 3:
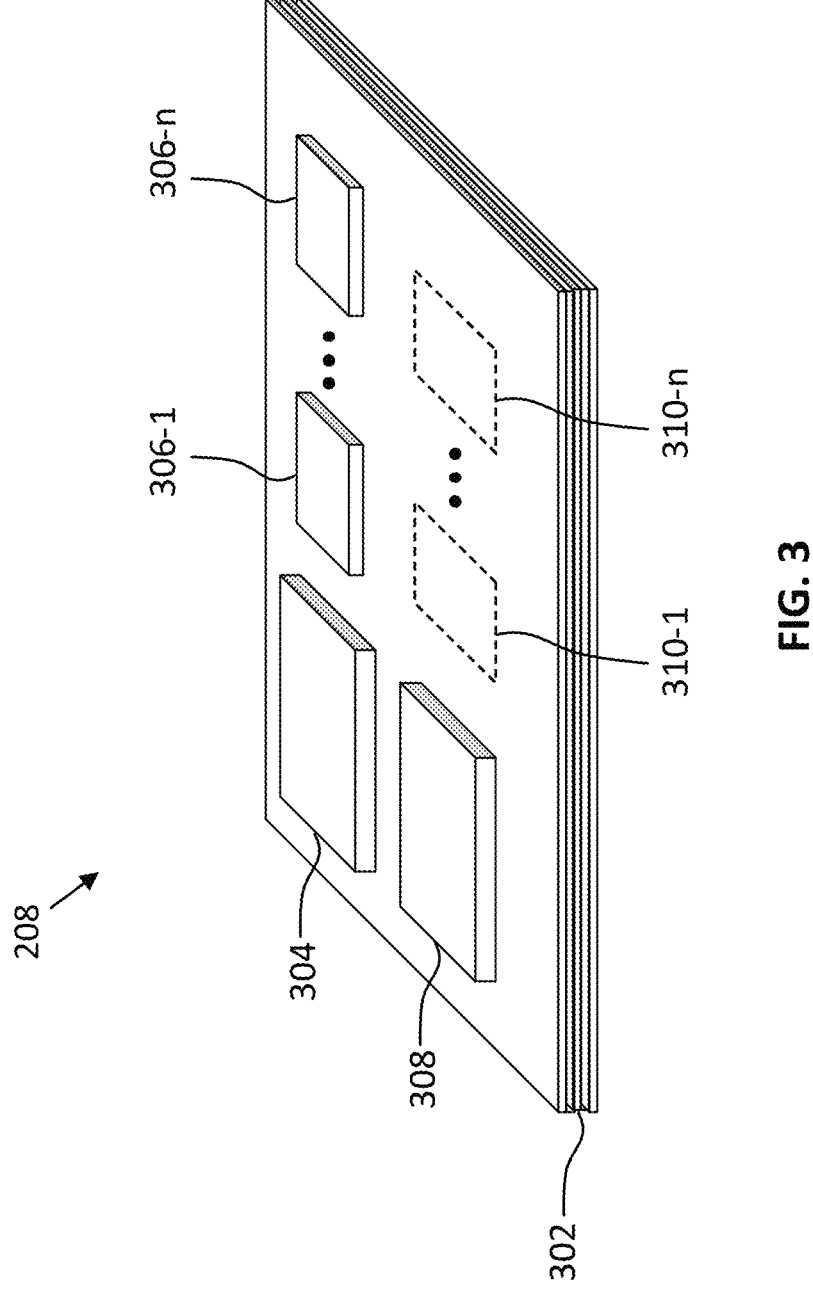
FIG. 3 illustrates a view of the RF front end circuitry of FIG. 2A or the RF front end circuitry of FIG. 2B implemented as a system-in-package (SIP), in accordance with an embodiment of the present disclosure.

FIG. 3 illustrates an example of interposer 208, according to some embodiments.

Interposer 208 includes a layer stack 302 having any number of dielectric (or airgap) and conductive layers that are patterned to form filters. Any number of semiconductor chips may be coupled to interposer 208. For example, a first semiconductor chip 304 may be provided that includes balanced LNAs or other amplifier architectures. Interposer 208 may also include a plurality of second semiconductor chips 306-1 to 306-n, used to generate local oscillator signals across any number of RF channels. Interposer 208 may also be coupled to a third semiconductor chip 308 that includes one or more mixers, used for upconversion and/or downconversion of the RF signals. In some embodiments, interposer 208 includes antenna 102 integrated on it. Each of the various components listed above in the different semiconductor chips may also be incorporated into fewer chips, or into one semiconductor chip, such as into receiver IC 214 or transmitter IC 220.

According to an embodiment, Interposer 208 includes one or more regions 310-1 to 310-n that provide integrated filters constructed from the insulating layers and conductive layers of layer stack 302. For example, different regions 310-1 to 310-n may be used to implement filter bank 210 and IF filter(s) 212. Each of the filters may be constructed based on coaxial arrangements of conductive lines that are arranged within layer stack 302. One example of interposer 208 is the Polystrata® interposer from Cubic Nuvotronics (Durham, NC).

Figure 4:
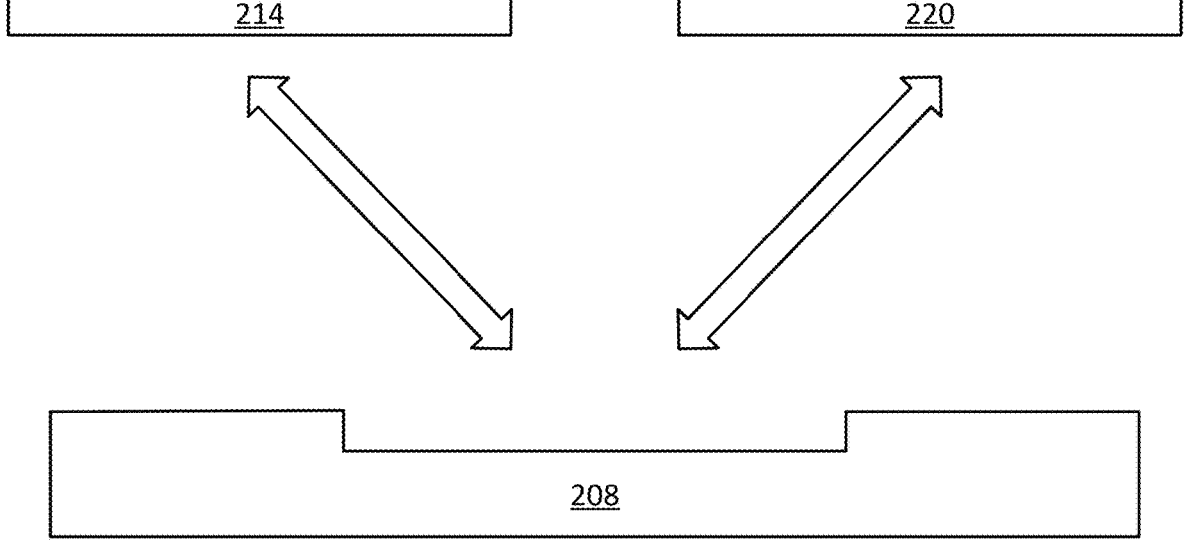
FIG. 4 illustrates the modular design of an interposer with different semiconductor dies, in accordance with an embodiment of the present disclosure.

FIG. 4 illustrates the modular design of interposer 208 that allows for either receiver IC 214 or transmitter IC 220 to be connected with interposer 208, according to some embodiments. In some examples, interposer 208 acts as a part of the chip package for receiver IC 214 or transmitter IC 220. As noted above, interposer 208 may be designed with common connections that interface with either receiver IC 214 or transmitter IC 220, while providing any number of integrated filters to be used by either receiver IC 214 or transmitter IC 220. More generally, interposer 208 may include any number of connections to instantiate any combination of Rx and Tx channels using the same filters on interposer 208. Accordingly, any chip coupled to interposer 208 could be strictly a receiver (Rx), strictly a transmitter (Tx), or a transceiver (Rx/Tx), according to some embodiments.

Figure 5A:
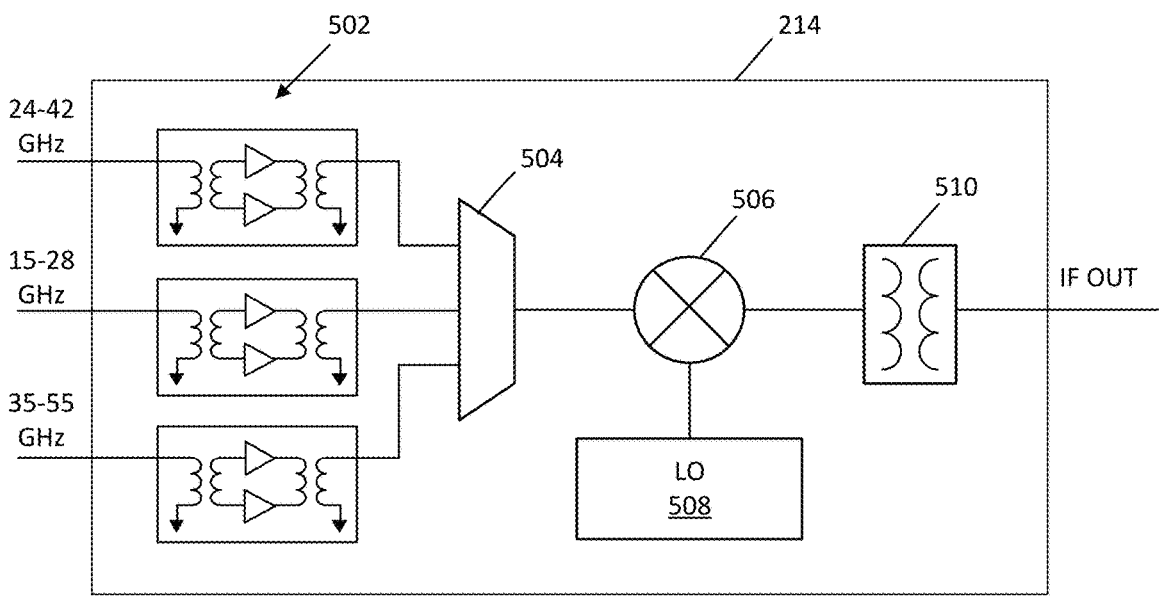
FIG. 5A illustrates a schematic diagram of a portion of a RF receiver chip, in accordance with an embodiment of the present disclosure.
Figure 5B:
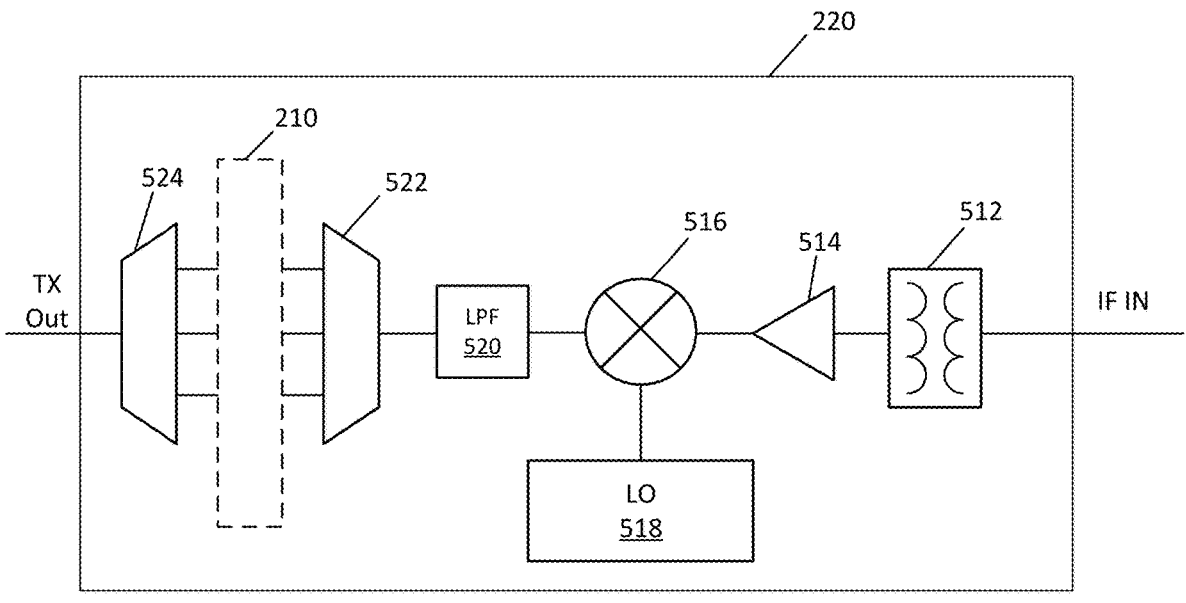
FIG. 5B illustrates a schematic diagram of a portion of a RF transmitter chip, in accordance with an embodiment of the present disclosure.

FIG. 5A illustrates a more detailed schematic of receiver IC 214 while FIG. 5B illustrates a more detailed schematic of transmitter IC 220, according to some embodiments. Starting with receiver IC 214, an amplifier block 502 may include any number of amplifiers across any number of RF channels. In the illustrated example, amplifiers are used for RF signals received from different filters of filter bank 210 on interposer 208 to provide different RF bands, such as 24-42 GHZ, 15-28 GHZ, or 35-55 GHz. According to some embodiments, the received signal is filtered by only one of the bandpass filters selected using switching bank 204.

Amplifier block 502 may include low-noise amplifiers (LNAs) or balanced LNAs. Any number of additional filters integrated on receiver IC 214 may also be used, such as low-pass filters for the lower bands and high-pass filters for the upper bands. For example, signals received from the 15-28 GHz or 24-42 GHz bands may pass through a low-pass filter while signals received from the 35-55 GHz band may pass through a high-pass filter.

According to some embodiments, after passing through amplifier block 502, the RF signal from any of the banks is selected via a multiplexer 504 or any other suitable switching device. The received RF signal within the selected band of interest (e.g., 15-28 GHZ, 24-42 GHZ, or 35-55 GHZ), is then mixed with an LO signal to be downconverted at mixer 506. The LO signal may be generated by an LO generator 508. The downconverted signal may pass through a balun 510 before passing on to amplifiers 206 off receiver IC 214. The output signal has been downconverted to an intermediate frequency range (IF OUT) for further processing. In one example, the intermediate frequency range is between 5 GHZ and 25 GHZ.

Turning to transmitter IC 220, a signal at an intermediate frequency (IF IN) may be received by a balun 512 and amplified using amplifier 514. The signal having the IF frequency, is then mixed with an LO signal to be upconverted at mixer 516. The LO signal may be generated by an LO generator 518. The upconverted signal may pass through a filter 520 and then proceed through a switching arrangement of, for example, a first multiplexer 522 and a second multiplexer 524 to select which filter to use from filter bank 210 before transmitting the filtered signal to antenna 102 (Tx Out). Filter 520 may be a high-pass or low-pass filter depending on the application. Accordingly, a given filter of filter bank 210 may be selected to set the transmission band of the RF signal (e.g., 15-28 GHZ, 24-42 GHZ, or 35-55 GHZ).

It should be noted that only one RF channel is shown in both receiver IC 214 and transmitter IC 220, but that any number of RF channels using the same illustrated components can be used. Some elements may be shared across multiple channels. For example, LO generator 508 may generate the LO signal for any number of mixers 506 in any number of channels on receiver IC 214. Likewise, LO generator 518 may generate the LO signal for any number of mixers 516 in any number of channels on transmitter IC 220.

According to some embodiments, LO generator 508 may use a local oscillating signal (e.g., from a crystal oscillator) or it may receive an oscillating signal from another LO generator either on the same die or on another die. For example, both receiver IC 214 and transmitter IC 220 may be present within the same device and LO generator 508 can act as a master oscillator control that provides the LO signal to be used by slave LO generator 518, or vice versa. In another example, LO generator 508 can provide the LO signal to any number of other receiver ICs or receive an LO signal from another receiver IC (e.g., sharing resources across Rx channels). In another example, LO generator 518 can provide the LO signal to any number of other transmitter ICs or receive an LO signal from another transmitter IC (e.g., sharing resources across Tx channels).

Figure 6:
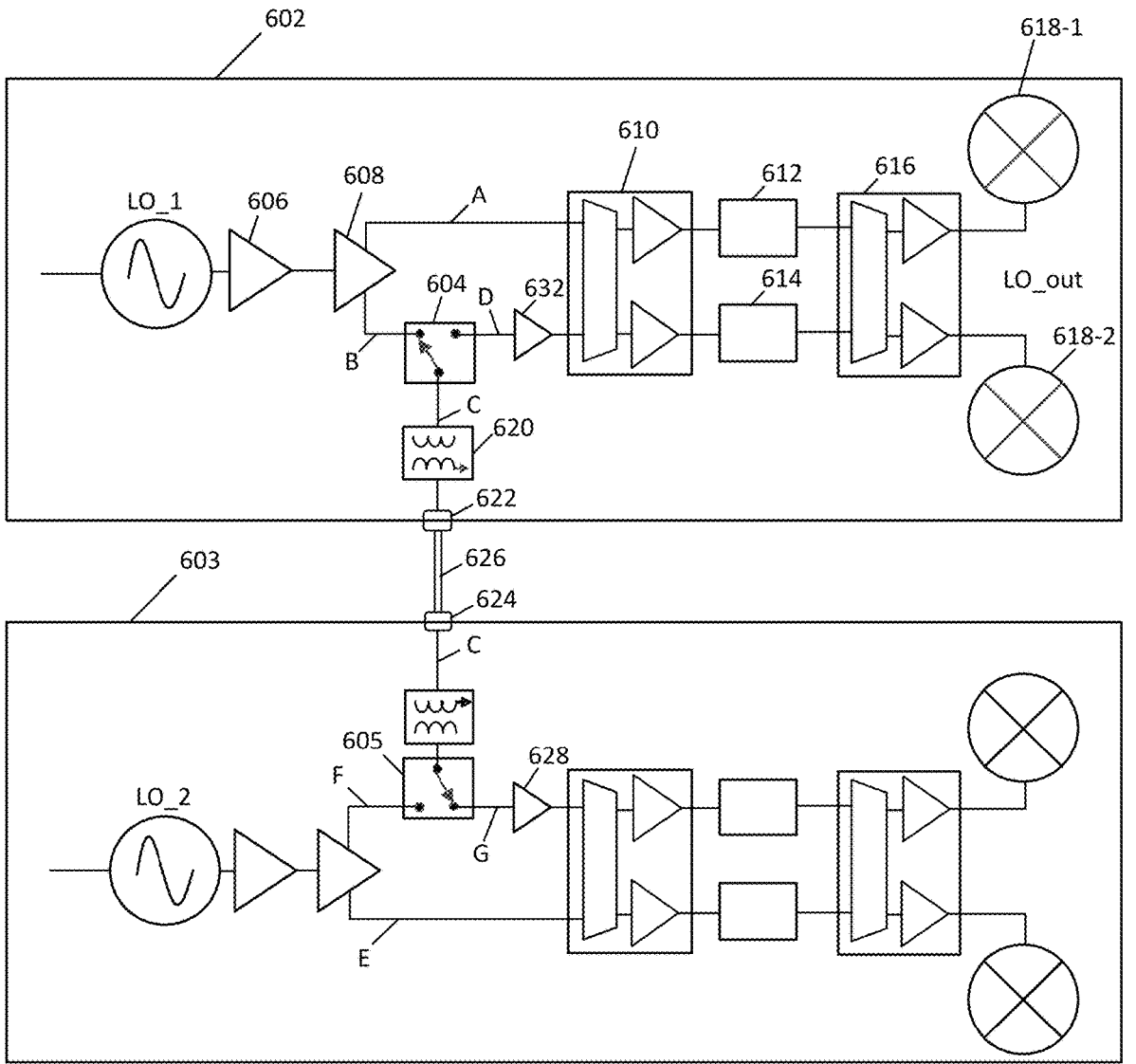
FIG. 6 illustrates a schematic diagram of a shared local oscillator network, in accordance with an embodiment of the present disclosure.

FIG. 6 illustrates a schematic example of how LO sharing can occur between different LO generators on different chips or dies, according to some embodiments. In some examples, a first LO generator 602 may be present on a first receiver or transmitter IC while a second LO generator 603 may be present on a second receiver or transmitter IC. The first and second ICs may be in separate chip packages on the same PCB, or in the same chip package (e.g., a SIP). In some embodiments, the first IC may be on a different PCB than the second IC.

First LO generator 602 includes a first oscillator source LO_1 while second LO generator 603 includes a second oscillator source LO_2. According to some embodiments, only one oscillator source is used to provide the LO signal for both first LO generator 602 and second LO generator 603. For example, first LO generator 602 may act as a master module where LO_1 is active and provides the oscillator signal for both first LO generator 602 and second LO generator 603 while LO_2 is inactive. In another example, second LO generator 603 may act as a master module where LO_2 is active and provides the oscillator signal for both second LO generator 603 and first LO generator 602 while LO_1 is inactive. Accordingly, one or more switches may be used to control the signal pathways between the two LO generators 602/603. For example, and with further reference to FIG. 6, the oscillator signal LO_1 may be split between a first signal path A and a second signal path B. A first switch 604 on the second signal path B may be designed to either connect a third signal path C to the second signal path B or to connect the third signal path C to a fourth signal path D. The oscillator signal LO_2 may be split between a fifth signal path E and a sixth signal path F. A second switch 605 on the sixth signal path F may be designed to either connect the third signal path C to the sixth signal path F or to connect the third signal path C to a seventh signal path G.

An example operating mode is now described with first LO generator 602 acting as the master module and second LO generator 603 acting as the slave module. The oscillator signal LO_1 is received by an amplifier 606 and then split using any suitable splitter element 608 across first signal path A and second signal path B. In some examples, splitter element 608 is a dual output amplifier that both splits and buffers each output signal path. First signal path A is coupled to a first multiplexer 610 while second signal path B is coupled to first switch 604. First multiplexer 610 may include any number of switches to provide multi-input, multi-output functionality. Accordingly, the LO_1 signal received on first signal path A may be routed to any number of different frequency multipliers, such as a frequency doubler 612 or a frequency tripler 614. In some embodiments, one or more outputs of first multiplexer 610 may be amplified or buffered. According to some embodiments, a second multiplexer 616 may be provided to receive the output from any one of the various frequency multipliers 612/614 and route the LO_out signal to one or more mixers 618-1 and 618-2 as the provided LO signal for mixing with either a received RF signal or with an IF signal to be transmitted. In the illustrated example, two mixers 618-1 and 618-2 are used for dual channel operation, but any number of mixers may be used for any number of channels. Accordingly, the outputs of second multiplexer 616 may provide the LO_out signal to any number of mixers. Second multiplexer 616 may be similar in design to first multiplexer 610. In some examples, one or more outputs of second multiplexer 616 are amplified or buffered.

Returning to first switch 604, when first LO generator 602 is the master module, first switch 604 is in a first state to couple second signal path B to third signal path C. Accordingly, the LO_1 signal is fed along first signal path A and also along third signal path C via first switch 604 and through balun 620 before being received by an input/output (I/O) port 622. Another I/O port 624 may be provided on or connected to second LO generator 603, and may be the same in design and function as I/O port 622. I/O ports 622 and 624 may be, for example, connector ports at an edge of a corresponding PCB or at the edge of an integrated circuit chip. When used on an integrated circuit chip, packaging connections such as wire bonds, ball grid arrays, or pin grid arrays may be used to provide an electrical connection with I/O ports 622 or 624. In other embodiments, I/O ports 622 and 624 may be coaxial ports or any other output port configured to be coupled with a cable connector.

According to some embodiments, an inter-module connector 626 is used to couple between I/O port 622 associated with first LO generator 602 and I/O port 624 associated with second LO generator 603. Inter-module connector 626 may be any suitable board-to-board connector to route the third signal path C between different PCBs, or between different ICs on a common PCB or within a common package. In some examples, inter-module connector 626 is a hardwired pathway to route the third signal path C between different chips on the same PCB or within the same system package. In any case, third signal path C extends between first LO generator 602 and second LO generator 603.

The elements on second LO generator 603 are substantially the same as those found on first LO generator 602, and so description of each of their operations is not repeated. Third signal path C is coupled to the input of second switch 605 on second LO generator 603. Second switch 605 may be designed to couple third signal path C to a sixth signal path F or to a seventh signal path G. In this example where first LO generator 602 is a master module and second LO generator 603 is a slave module, the signal on third signal path C is coupled to seventh signal path G via second switch 605. According to some embodiments, an amplifier 628 may be coupled to seventh signal path G to account for signal losses across third signal path C between the modules. In this example, the LO signal on first signal path A is substantially the same as the LO signal on seventh signal path G, such that first LO generator 602 provides the master LO signal to be used by second LO generator 603 and LO_2 is deactivated. The LO signal on seventh signal path G may go through similar elements as discussed above for first LO generator 602 before being fed to any number of mixer elements.

In an example where second LO generator 603 is the master module while first LO generator 602 is the slave module, both first switch 604 and second switch 605 are flipped to their alternative states such that first switch 604 couples third signal path C to fourth signal path D and second switch 605 couples third signal path C to sixth signal path F. Additionally, LO_1 would be deactivated. In this situation, LO_2 provides the master LO signal at both fifth signal path E on second LO generator 603 and at fourth signal path D on first LO generator 602. According to some embodiments, an amplifier 632 is provided on fourth signal path D to account for losses as the signal traverses third signal path C between the modules.

Either or both LO_1 and LO_2 may be between about 10 GHZ and about 20 GHZ, according to some examples. The LO_out signal may be, for example, between about 20 GHZ and about 55 GHz. According to some embodiments, first LO generator 602 may be coupled to a first interposer on a first PCB and second LO generator 603 may be coupled to a second interposer either on the first PCB or on a second PCB.

According to some embodiments, first LO generator 602 and second LO generator 603 have substantially the same architecture with digital signals determining the states of first switch 604 and second switch 605. Furthermore, LO_1 and LO_2 may be activated or deactivated by a controller to determine the master or slave status of first LO generator 602 and second LO generator 603. In some embodiments, both LO generator 602 and second LO generator 603 can operate as stand-alone LO generators independently from one another.

Figures 7A, 7B:
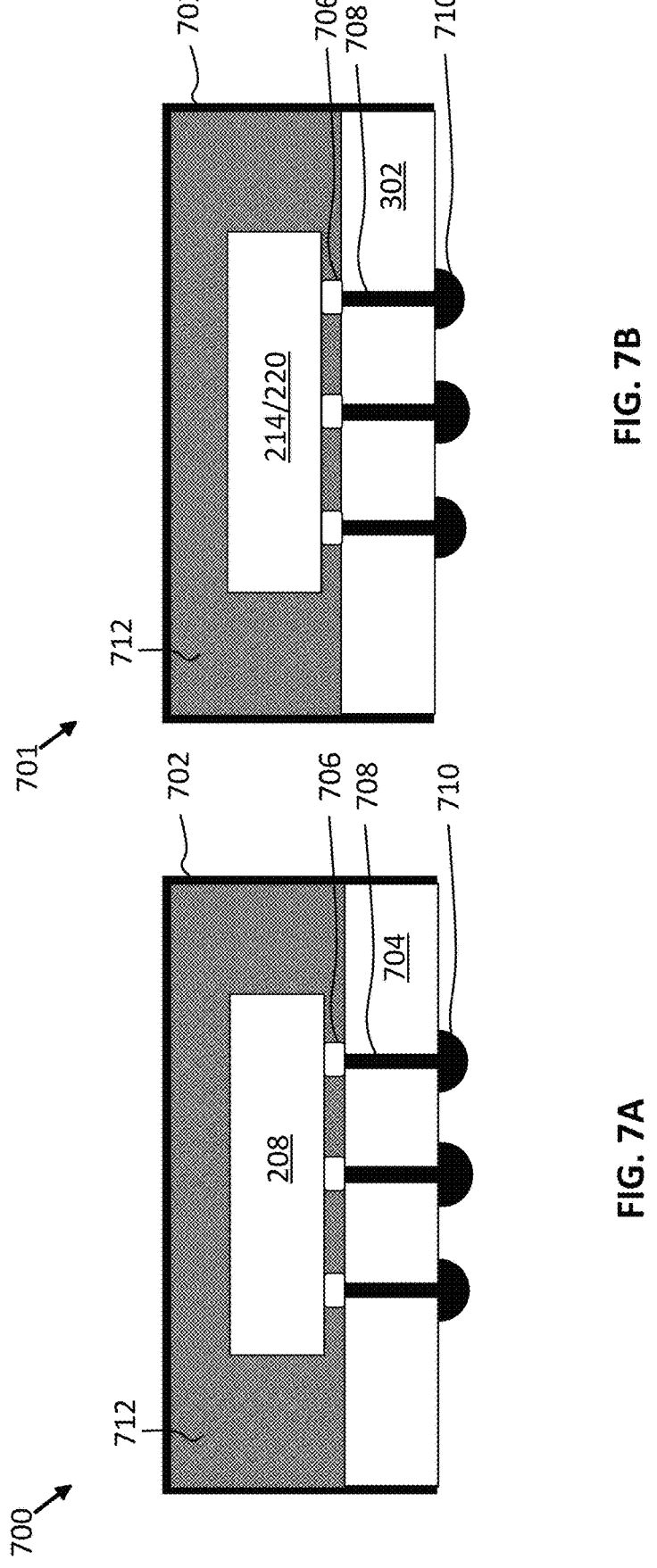
FIG. 7A illustrates a cross-section view of a chip package that may contain a SIP of FIG. 3, in accordance with an embodiment of the present disclosure.
FIG. 7B illustrates a cross-section view of a chip package that may contain a SIP of FIG. 3, in accordance with another embodiment of the present disclosure.

FIG. 7A illustrates an example embodiment of a chip package 700. As can be seen, chip package 700 may be a SIP that includes interposer 208. Other dies may be included as well within chip package 700 and coupled to the same package substrate 704. Interposer 208 may include any number of IC chips and integrated componentry (e.g., filters, transformers, amplifiers, etc.), as discussed above. As can be further seen, chip package 700 includes a housing 702 that is bonded to package substrate 704. Housing 702 may be any material that provides environmental protection for the components of chip package 700. Interposer 208 may be conductively coupled to package substrate 704 using connections 706. In some embodiments, connections 706 represent any connection mechanism, such as solder bumps, ball grid array (BGA), pins, or wire bonds, to name a few examples. Package substrate 704 may include a dielectric material having conductive pathways (e.g., including conductive vias and lines) extending through the dielectric material between the faces of package substrate 704, or between different locations on each face. For example, package substrate 704 may include multiple stacked layers of dielectric material with conductive traces running surfaces of one or more of the layers of dielectric material, and one or more conductive vias extending between any number of the layers of dielectric material. Additional conductive contacts 710 may be disposed at an opposite face of package substrate 704 for conductively contacting, for instance, a printed circuit board or another chip package. One or more interconnect features 708 extend through a thickness of package substrate 704 to provide conductive pathways between one or more of connections 706 to one or more of contacts 710. Any integrated circuit package technology may be used. Contacts 710 may be solder balls (e.g., for bump-based connections or a ball grid array arrangement), but any suitable package bonding mechanism may be used (e.g., pins in a pin grid array arrangement, lands in a land grid array arrangement, or wirebonds). In some embodiments, a dielectric (e.g., solder resist) is disposed between contacts 710, to inhibit shorting.

In some embodiments, a mold material 712 may be disposed around interposer 208 included within housing 702. In some embodiments, mold material 712 is included between interposer 208 and package substrate 704 as an underfill material, as well as between interposer 208 and housing 702 as an overfill material). Example mold material 712 includes, for instance, epoxy mold materials. In some cases, mold material 712 is thermally conductive, in addition to being electrically insulating. In some embodiments, mold material 712 causes little to no attenuation of RF signals being received by, or transmitted from, interposer 208.

FIG. 7B illustrates another embodiment of a chip package 701. Chip package 701 is also a SIP that instead includes layer stack 302 of interposer 208 as the package substrate. According to some embodiments, one or more chips (such as, for example, receiver IC 214 and transmitter IC 220) are bonded to layer stack 302 using connections 706. The remaining components of chip package 701 may be the same as those described for chip package 700.

Example Communication Device

Figure 8:
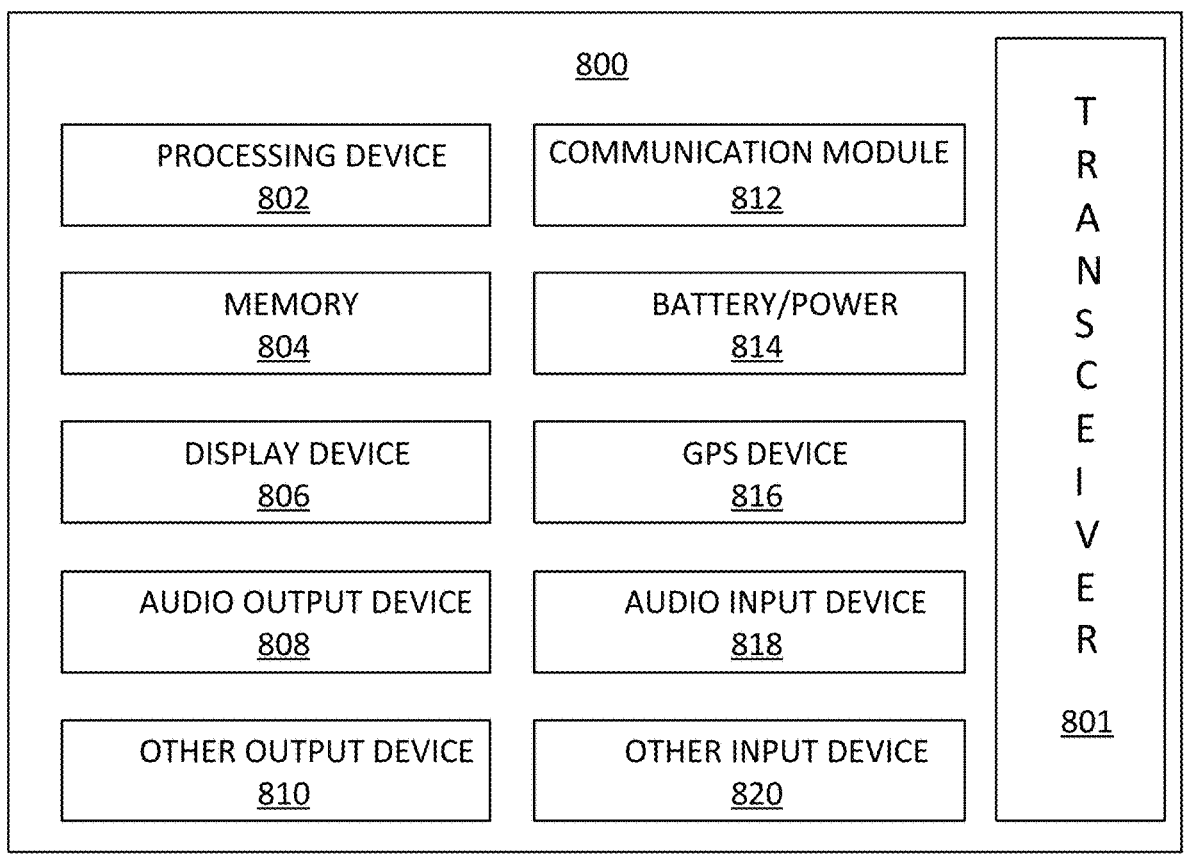
FIG. 8 illustrates a block diagram of an example communication device that may include a wide-band transceiver, in accordance with an embodiment of the present disclosure.

FIG. 8 is a block diagram of an example communication device 800 that may include a wideband receiver, or transceiver, that includes an RF front end circuitry in accordance with any of the embodiments disclosed herein. For example, communication device 800 includes transceiver 801 that may include both RF front end circuitry 104 and RF front end circuitry 112 for receiving and transmitting RF signals in the GHz range. Other frequency bands may be used as well, depending on the application. Several components are illustrated in FIG. 8 as included in the communication device 800, but any one or more of these components may be omitted or duplicated, as suitable for the application. In some embodiments, some or all of the components included in the communication device 800 may be attached to one or more motherboards. In some embodiments, some or all of these components are fabricated onto a single SIP. Note that communication device 800 may be interchangeably referred to as a communication apparatus or system. More generally, device 800 (or apparatus or system 800, as the case may be) may be referred to as an integrated wideband transceiver having both receive and transmit circuitry implemented within a common integrated circuit package, which may in turn be part of a higher-level system that includes one or more circuit boards on which the integrated circuit package may be populated.

Additionally, in various embodiments, communication device 800 may not include one or more of the components illustrated in FIG. 8, but communication device 800 may include interface circuitry for coupling to the one or more components. For example, communication device 800 may not include a display device 806, but may include display device interface circuitry (e.g., a connector and driver circuitry) to which display device 806 may be coupled. In another set of examples, communication device 800 may not include an audio input device 818 or an audio output device 808 but may include audio input or output device interface circuitry (e.g., connectors and supporting circuitry) to which audio input device 818 or audio output device 808 may be coupled.

Communication device 800 may include a processing device 802 (e.g., one or more processing devices). As used herein, the term "processing device" or "processor" may refer to any device or portion of a device that processes electronic data from registers and/or memory to transform that electronic data into other electronic data that may be stored in registers and/or memory. Processing device 802 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. Communication device 800 may include a memory 804, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, memory 804 may include memory that shares a die with processing device 802. This memory may be used as cache memory and may include embedded memory.

In some embodiments, communication device 800 may include one or more communication modules 812. For example, communication module 812 may be configured for managing wired and/or wireless communications for the transfer of data to and from communication device 800. In some embodiments, communication module 812 may manage wired communications, such as electrical, optical, or any other suitable communication protocols (e.g., the Ethernet). In still other embodiments, communication module 812 may include multiple communication modules. For instance, in some such embodiments, a first communication module 812 may be dedicated to short-range wireless communications (e.g., Wi-Fi or Bluetooth), and a second communication module may be dedicated to long-range wireless communications (e.g., satellite-based coms, such as GPS)). In still other such embodiments, a first communication module 812 may be dedicated to wireless communications, and a second communication module 812 may be dedicated to wired communications.

Communication device 800 may include battery/power circuitry 814. Battery/power circuitry 814 may include one or more energy storage devices (e.g., batteries or capacitors) and/or circuitry for coupling components of communication device 800 to an energy source separate from communication device 800 (e.g., AC line power).

Communication device 800 may include a display device 806 (or corresponding interface circuitry, as discussed above). Display device 806 may include any visual indicators, such as a heads-up display, a computer monitor, a projector, a touchscreen display, a liquid crystal display (LCD), a light-emitting diode display, or a flat panel display.

Communication device 800 may include an audio output device 808 (or corresponding interface circuitry, as discussed above). Audio output device 808 may include any device that generates an audible indicator, such as speakers, headsets, or earbuds.

Communication device 800 may include audio input device 818 (or corresponding interface circuitry, as discussed above). Audio input device 818 may include any device that generates a signal representative of a sound, such as microphones, microphone arrays, or digital instruments.

Communication device 800 may include a GPS device 816 (or corresponding interface circuitry, as discussed above). GPS device 816 may be in communication with a satellite-based system and may receive a location of communication device 800.

Communication device 800 may include any other output device 810 (or corresponding interface circuitry). Examples of other output devices 810 may include an audio codec, a video codec, a printer, a wired or wireless transmitter for providing information to other devices, or an additional storage device.

Communication device 800 may include any other input device 820 (or corresponding interface circuitry). Examples of other input devices 820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

Communication device 800 may have any desired form factor, such as a handheld or mobile communication device (e.g., a cell phone, a smart phone, a mobile internet device, a music player, a tablet computer, a laptop computer, a netbook computer, an ultrabook computer, a personal digital assistant (PDA), an ultra-mobile personal computer, etc.), a desktop communication device, a server or other networked computing component, a printer, a scanner, a monitor, a set-top box, an entertainment control unit, a vehicle control unit, a digital camera, a digital video recorder, or a wearable communication device. In some embodiments, the communication device 800 may be any other electronic device that processes data.

Unless specifically stated otherwise, it may be appreciated that terms such as "processing," "computing," "calculating,"

"determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

FURTHER EXAMPLE EMBODIMENTS

The following examples pertain to further embodiments, from which numerous permutations and configurations will be apparent.

Example 1 is a communications circuit that includes a first circuit block and a second circuit block. The first circuit block includes a first splitter configured to receive a first local oscillator signal from a first local oscillator, a first signal path coupled to a first output of the first splitter, a second signal path coupled to a second output of the first splitter, a first switch configured to couple the second signal path to a third signal path or to couple a fourth signal path to the third signal path, and a first multiplexer having a first input coupled to the first signal path and a second input coupled to the fourth signal path. The second circuit block includes a second splitter configured to receive a second local oscillator signal from a second local oscillator, a fifth signal path coupled to a first output of the second splitter, a sixth signal path coupled to a second output of the second splitter, a second switch configured to couple the sixth signal path to the third signal path or to couple a seventh signal path to the third signal path, and a second multiplexer having a first input coupled to the fifth signal path and a second input coupled to the seventh signal path. The third signal path extends between the first circuit block and the second circuit block.

Example 2 includes the communications circuit of Example 1, wherein the first local oscillator signal or the second local oscillator signal has a frequency between 10 GHz and 20 GHz.

Example 3 includes the communications circuit of Example 1 or 2, wherein one or more outputs of the first multiplexer are coupled to one or more frequency multiplier circuits.

Example 4 includes the communications circuit of Example 3, wherein one or more outputs of the one or more frequency multiplier circuits are coupled to one or more inputs of a third multiplexer.

Example 5 includes the communications circuit of Example 4, wherein one or more outputs of the third multiplexer are coupled to one or more mixers configured to mix signals on the one or more outputs of the third multiplexer with one or more received RF signals.

Example 6 includes the communications circuit of Example 5, wherein the signals on the one or more outputs of the third multiplexer have a frequency between 20 GHz and 55 GHz.

Example 7 includes the communications circuit of any one of Examples 1-6, wherein the first circuit block is on a first semiconductor die and the second circuit block is on a second semiconductor die.

Example 8 includes the communications circuit of Example 7, wherein the first semiconductor die is coupled to a first interposer having one or more first integrated filters, and the second semiconductor die is coupled to a second interposer having one or more second integrated filters.

Example 9 includes the communications circuit of Example 7 or 8, wherein the first semiconductor die and the second semiconductor die each comprise silicon and germanium.

Example 10 includes the communications circuit of any one of Examples 7-9, wherein the first semiconductor die is on a first printed circuit board and the second semiconductor die is on a second printed circuit board.

Example 11 includes the communications circuit of any one of Examples 7-9, wherein the first semiconductor die and the second semiconductor die are located within a same integrated circuit package.

Example 12 includes the communications circuit of any one of Examples 1-11, wherein the first circuit block further comprises a first amplifier on the fourth signal path and the second circuit block further comprises a second amplifier on the seventh signal path.

Example 13 includes the communications circuit of any one of Examples 1-12, wherein the first switch couples the second signal path to the third signal path and the second switch couples the seventh signal path to the third signal path such that the first local oscillator signal is received by the seventh signal path on the second circuit block and the second local oscillator is disabled.

Example 14 includes the communications circuit of any one of Examples 1-12, wherein the first switch couples the fourth signal path to the third signal path and the second switch couples the sixth signal path to the third signal path such that the second local oscillator signal is received by the fourth signal path on the first circuit block and the first local oscillator is disabled.

Example 15 is an integrated circuit including the communications circuit of any one of Examples 1-14.

Example 16 is a system-in-package (SIP) device that includes a three-dimensional interposer and an integrated circuit die on the three-dimensional interposer. The three-dimensional interposer comprises a plurality of filters on, or integrated into, the structure of the three-dimensional interposer. The integrated circuit die includes a splitter configured to receive a local oscillator signal from a local oscillator, a first signal path coupled to a first output of the splitter, a second signal path coupled to a second output of the splitter, and a first switch configured to couple the second signal path to a third signal path or to couple a fourth signal path to the third signal path. The third signal path leads off of the integrated circuit chip.

Example 17 includes the SIP device of Example 16, wherein the integrated circuit die is a first integrated circuit die and the third signal path extends between the first integrated circuit die and a second integrated circuit die.

Example 18 includes the SIP device of Example 16 or 17, wherein the integrated circuit die comprises silicon and germanium.

Example 19 includes the SIP device of any one of Examples 16-18, wherein the local oscillator signal has a frequency between 10 GHz and 20 GHz.

Example 20 includes the SIP device of any one of Examples 16-19, wherein the integrated circuit die further comprises a multiplexer having a first input coupled to the first signal path and a second input coupled to the fourth signal path.

Example 21 includes the SIP device of Example 20, wherein one or more outputs of the multiplexer are coupled to one or more frequency multiplier circuits.

Example 22 includes the SIP device of Example 21, wherein the multiplexer is a first multiplexer and one or more outputs of the one or more frequency multiplier circuits are coupled to one or more inputs of a second multiplexer.

Example 23 includes the SIP device of Example 22, wherein one or more outputs of the second multiplexer are coupled to one or more mixers configured to mix signals on the one or more outputs of the second multiplexer with one or more received RF signals.

Example 24 includes the SIP device of Example 23, wherein the signals on the one or more outputs of the second multiplexer have a frequency between 20 GHZ and 55 GHZ.

Example 25 includes the SIP device of any one of Examples 16-24, wherein the integrated circuit die further comprises an amplifier on the fourth signal path.

Example 26 is a radio frequency (RF) system that includes an antenna, RF circuitry configured to receive a first RF signal from the antenna and provide a first intermediate frequency (IF) signal or configured to receive a second IF signal and transmit a second RF signal to the antenna, an analog-to-digital converter (ADC) configured to receive the first IF signal and to generate a digitized signal or a digital-to-analog converter (DAC) configured to receive a digitized signal and generate the second IF signal, and a digital signal processor configured to receive the digitized signal from the ADC or to generate the digitized signal transmitted to the DAC. The RF circuitry comprises a splitter configured to receive a local oscillator signal from a local oscillator, a first signal path coupled to a first output of the splitter, a second signal path coupled to a second output of the splitter, a first switch configured to couple the second signal path to a third signal path or to couple a fourth signal path to the third signal path, and a second switch configured to couple a fifth signal path to the third signal path or to couple a sixth signal path to the third signal path.

Example 27 includes the RF system of Example 26, wherein the RF circuitry is on a first integrated circuit die and the third signal path extends between the first integrated circuit die and a second integrated circuit die.

Example 28 includes the RF system of Example 27, wherein the first and second integrated circuit dies comprise silicon and germanium.

Example 29 includes the RF system of any one of Examples 26-28, wherein the local oscillator signal has a frequency between 10 GHz and 20 GHz.

Example 30 includes the RF system of any one of Examples 26-29, wherein the RF circuitry further comprises a multiplexer having a first input coupled to the first signal path and a second input coupled to the fourth signal path.

Example 31 includes the RF system of Example 30, wherein one or more outputs of the multiplexer are coupled to one or more frequency multiplier circuits.

Example 32 includes the RF system of Example 31, wherein the multiplexer is a first multiplexer and the one or more frequency multiplier circuits are coupled to one or more inputs of a second multiplexer.

Example 33 includes the RF system of Example 32, wherein one or more outputs of the second multiplexer are coupled to one or more mixers configured to mix signals on the one or more outputs of the second multiplexer with the first RF signal or the second IF signal.

Example 34 includes the RF system of Example 33, wherein the signals on the one or more outputs of the second multiplexer have a frequency between 20 GHz and 55 GHz.

Example 35 includes the RF system of any one of Examples 26-34, wherein the RF circuitry further comprises an amplifier on the fourth signal path.

Example 36 is an integrated circuit including the RF system of any one of Examples 26-35.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A communications circuit, comprising:
a first circuit block, comprising:
    a first splitter configured to receive a first local oscillator signal from a first local oscillator,
    a first signal path coupled to a first output of the first splitter,
    a second signal path coupled to a second output of the first splitter,
    a first switch configured to couple the second signal path to a third signal path or to couple a fourth signal path to the third signal path, and
    a first multiplexer having a first input coupled to the first signal path and a second input coupled to the fourth signal path; and
a second circuit block, comprising:
    a second splitter configured to receive a second local oscillator signal from a second local oscillator;
    a fifth signal path coupled to a first output of the second splitter;
    a sixth signal path coupled to a second output of the second splitter;
    a second switch configured to couple the sixth signal path to the third signal path or to couple a seventh signal path to the third signal path; and
    a second multiplexer having a first input coupled to the fifth signal path and a second input coupled to the seventh signal path;
wherein the third signal path extends between the first circuit block and the second circuit block.

2. The communications circuit of claim 1, wherein one or more outputs of the first multiplexer are coupled to one or more frequency multiplier circuits.

3. The communications circuit of claim 2, wherein one or more outputs of the one or more frequency multiplier circuits are coupled to one or more inputs of a third multiplexer.

4. The communications circuit of claim 3, wherein one or more outputs of the third multiplexer are coupled to one or more mixers configured to mix signals on the one or more outputs of the third multiplexer with one or more received RF signals.

5. The communications circuit of claim 1, wherein the first circuit block is on a first semiconductor die and the second circuit block is on a second semiconductor die.

6. The communications circuit of claim 5, wherein the first semiconductor die and the second semiconductor die are located within a same integrated circuit package.

7. The communications circuit of claim 5, wherein the first semiconductor die is on a first printed circuit board and the second semiconductor die is on a second printed circuit board.

8. The communications circuit of claim 1, wherein the first circuit block further comprises a first amplifier on the fourth signal path and the second circuit block further comprises a second amplifier on the seventh signal path.

9. An integrated circuit including the communications circuit of claim 1.

* * * * *